Patented Nov. 6, 1934

1,980,043

UNITED STATES PATENT OFFICE 1,980,043

EQUILIBRATED PAINT AND VARNISH REMOVER CONTAINING PETROLEUM HYDROCARBONS

Carleton Ellis, Montclair, N. J., assignor to Chadeloid Chemical Company, New York, N. Y., a corporation of West Virginia No Drawing. Application August 15, 1928, Serial No. 299,876

7 Claims. (Cl. 87—5)

This invention relates to a substantially non-benzolic finish remover and particularly relates to an equilibrated paint and varnish remover containing light petroleum hydrocarbons as wax solvents substantially free from, or adjusted with respect to, hydrocarbon-accelerators of evaporation, and a wax precipitant miscible, or rendered miscible, with said wax solvent; such a remover having a cutting efficiency preferably approaching that of the standardized benzol-containing removing compositions of the present day and having such a minimized volatility that it possesses a low rate of evaporation.

Commercially successful paint and varnish removers used at the present time almost invariably contain benzol as the essential wax solvent, in conjunction with other solvents, such as acetone, alcohols, esters, and the like. While benzol is not a good solvent for dried paints and varnishes when used alone, it forms a very efficient mixture with other solvents of an alcoholic or ketonic nature.

In any paint removing composition, to meet the demands of the market, two essential conditions should be fulfilled, namely, the requirement of speedy action, in other words, good cutting efficiency, and secondly, the requirement of low rate of evaporation, that is, the property of a paint removing mixture to remain wet for a considerable length of time.

It is often very difficult to satisfy to a desired degree both these fundamental requirements simultaneously, because of the necessity of proper balance of the solvents with regard to their solvent power and their physical constants. Oftentimes conditions necessary to fulfill one of these fundamental requirements may at the same time be in contradiction with another basic requirement.

Benzol, as noted, while not a good solvent for dried coatings of paint or varnish when used alone, serves as an effective penetrant and carrier for loosening alcoholic or ketonic solvents and therefore has been considered a most essential ingredient of organic solvent paint and varnish removers. However, benzol has been questioned because of its possible injurious action on human health.

It is the object of my invention to utilize non-benzolic wax solvents to form mixtures which will exhibit an activity at least equal to or approximating the activity of benzol-containing paint and varnish removers.

In waxy-bodied paint and varnish removers benzol serves a double purpose, it functions as a wax solvent and provides penetrating power. As is known, the wax is used to retard evaporation of the solvent mixture. Brought into suspension in a semi-colloidal state, wax is capable of producing a surface-film which acts as a retarder of evaporation. In order to bring the wax to such a state it can, for example, be dissolved in a wax solvent and then be precipitated from the solution with another finish solvent, which is miscible with the wax solvent, which by itself is not a solvent for the wax. Alcohols, ketones, esters and many other organic solvents can be used for the latter purpose.

Higher homologues of benzol, such as toluol or xylol, are good solvents for wax and they also possess the penetrating power of benzol to a considerable degree, but they have the disadvantage as compared with benzol of increasing the rate of evaporation of paint and varnish remover solvents if used in conjunction with such low-boiling high-powered loosening solvents as acetone or methyl alcohol.

For showing this relation, evaporation tests were made on removers containing these three hydrocarbons (benzol, toluol and xylol) in mixtures consisting of:

| | Parts |
|---|---|
| Hydrocarbon | 50 |
| Anhydrous methanol | 25 |
| Anhydrous acetone | 25 |
| Paraffin wax | 2 |

The tests showed that while a mixture containing benzol (boiling point 80° C.) as the hydrocarbon, exhibits almost no loss in weight in twenty-four hours (and only about 0.5% in two hours), the composition which contains toluol (boiling point 111° C.) shows about 7% loss of weight in one-half hour and about 20% loss in weight in two hours under the same conditions, and that which contains xylol (boiling point 142° C.) shows over 18% loss of weight in one-half hour and about 37% loss in weight in the two hours.

Highly volatile petroleum hydrocarbons, being cheap and abundant in supply and possessing a notable solvent power for wax, have always been considered as prospective ingredients in paint removing mixtures in place of benzol. Such petroleum hydrocarbons, suitable for use in paint and varnish remover, may include distillates from petroleum of different origin and from different processes of manufacture. They may be from straight run gasoline, as well as from cracked gasoline. Owing to its more pronounced odor cracked gasoline may be found objectionable in certain cases on this ground, but it is not objectionable from the standpoint of use in remover as a wax solvent.

In addition to being cheap solvent materials and moreover always readily obtainable, highly volatile petroleum hydrocarbons are generally considered to have relatively only a very slight physiological effect, thus being especially desirable for removers intended for indoor use. Such hydrocarbons, however, possess many substantial disadvantages which have not been successfully overcome up to the present time. Contrary to benzol, when mixed with other solvents they decrease instead of improve the efficiency of these solvents, and in addition they often-times present another difficulty, namely, that arising from their poor miscibility with many other solvents, such as alcohols or ketones, especially in the presence of wax and traces of water. Mineral wax (even in traces) destroys that scant degree of miscibility which otherwise might obtain. Another serious detriment is the property of these hydrocarbons of greatly decreasing the cutting activity of other solvents. These drawbacks have been so serious as to greatly restrict the use of, or even completely disqualify, petroleum hydrocarbons in paint and varnish removing compositions.

The miscibility of petroleum hydrocarbons with other solvents, such as alcohols, varies considerably according to the boiling range of these hydrocarbons. While extremely light petroleum fractions, such as petroleum ether (boiling point 40–60° C.) are, for example, comparatively easily miscible with alcohols, the fractions with slightly higher boiling range became more and more immiscible as the boiling range expands upwardly. The use of the very lightest liquid fractions of petroleum hydrocarbons, e. g., petroleum ether, in removing compositions has the disadvantage of lowered flash-point. A considerable proportion of the low-boiling petroleum hydrocarbons have a higher vapor pressure than benzol and a petroleum fraction of about the same boiling point as benzol generally will be found more volatile than benzol, under service conditions.

Despite the foregoing I have found petroleum hydrocarbon fractions with boiling range from, say, 60° to 100° C. or of a narrower range, e. g., 60–85° C., may be employed in paint, varnish and lacquer removers if certain conditions are established as will be hereinafter set forth. The conditions of equilibration as described herein enable the successful employment of petroleum hydrocarbons of a boiling range extending still higher than 100° C.

Petroleum hydrocarbons cannot, however, be successfully used indiscriminately in that vague manner which the prior art suggests. The idiosyncrasies of these hydrocarbons, especially their miscibility-behavior with change in boiling point range, are such that, so far as I am advised, only by an observance of the equilibration features of the present invention can one prepare truly active cutting compositions instead of the nondescript haphazard ones to which the prior art obscurely alludes.

Although light petroleum hydrocarbons are powerful solvents of mineral wax, the solution of hydrocarbon and wax becomes strangely incompatible with various desirable loosening solvents of that high degree of volatility which is usually a concomitant of superior cutting activity.

The influence of wax upon the miscibility of alcoholic solvents with straight-run petroleum hydrocarbons, for example, certain of those having a boiling range around 60–85° C., becomes very pronounced. This petroleum fraction, even without additional wax, has very limited powers of miscibility; for example, at room temperature it is not miscible with methyl alcohol. The addition of even traces of paraffin or ceresin wax to a mixture of ethyl alcohol, acetone and this fraction, immediately produces a separation of petroleum hydrocarbons and wax (in solution therein). As the wax content increases such separation occurs with a wider range of solvents, thus creating great difficulty in composing a proper removing mixture because such lack of miscibility eliminates many of the most efficient solvents for dried paints and varnishes. From the table, given elsewhere herein, which shows the comparative cutting power of various solvents, it may be seen that anhydrous methanol, acetone, "lugosol" and methyl acetate are among the most desirable readily available loosening solvents. However, a very careful adjustment of proportions, when mixtures of these solvents are used with petroleum hydrocarbons in the presence of wax, is required in order to produce miscibility or solvent-homogeneity with its concomitant advantages. For example, a mixture of

|   | Parts |
|---|---|
| Petroleum ether (B. P. 60 to 85° C.) | 40 |
| "Lugosol" | 20 |
| Methyl acetate | 20 |
| Anhydrous methanol | 20 |
| Paraffin wax | 2 | separated into two layers, while a mixture of:

|   | Parts |
|---|---|
| Petroleum ether (B. P. 60 to 85° C.) | 30 |
| "Lugosol" | 20 |
| Methyl acetate | 30 |
| Anhydrous methanol | 20 |
| Paraffin wax | 2 | remained uniform and unstratified.

If methyl acetate is omitted the difficulties become greater. Those alcohols which are cheapest and most effective are the ones which show the most disturbing separation tendencies. Examples of several of such mixtures are represented in the table below:

|  | I | II | III |
|---|---|---|---|
| Petroleum distillate (B. P. 60 to 85° C.) | 30 | 30 | 30 |
| "Lugosol" | 40 | 40 | 40 |
| Anhydrous ethyl alcohol | 30 | | |
| Anhydrous methyl alcohol | | 30 | |
| Anhydrous isopropyl alcohol | | | 30 |
| Paraffin wax | 2 | 2 | 2 |

Compositions I and II separated into two layers, while composition III remained uniform. Isopropyl alcohol, which is miscible, is not nearly as active a cutting solvent as anhydrous methyl alcohol.

Petroleum fractions of lower boiling point, such as petroleum ether, exhibit better miscibility with other solvents of the wax precipitant type in presence of that essential but disturbing component, namely the wax, as already mentioned, but in this case also the same stratification difficulty may arise as, for example, in the case of the composition:

|   | Parts |
|---|---|
| Petroleum ether (B. P. 60 to 115° C.) | 15 |
| Petroleum ether (B. P. 40 to 60° C.) | 15 |
| "Lugosol" | 40 |
| Anhydrous methanol | 30 |
| Paraffin wax | 2 |

Even when part of the petroleum hydrocarbon is replaced with a benzenoid hydrocarbon, separation is observed in some cases as, for example, in the mixture:

| | Parts |
|---|---|
| Petroleum ether (B. P. 60 to 115° C.) | 25 |
| Solvent naphtha | 25 |
| Acetone | 25 |
| Paraffin wax | 4 |

If, however, acetone is replaced with methyl ethyl ketone in this mixture, no separation occurs.

The foregoing examples tend to illustrate and explain my averment that the preparation of a satisfactory remover, of high efficiency for general use, containing petroleum hydrocarbons as the main or essential wax solvent and being free or substantially free from benzol, is not a simple matter. The peculiarities of these hydrocarbons render equilibration, with its recognition of the proper solvents and their proportions to be used in association with such hydrocarbons, a consideration of prime importance for the creation of powerful cutting removers, which will remain unstratified and apparently homogeneous from the solvent standpoint, through the usual working-temperature range.

A remover in which the solvents are fully miscible at say 75° F., but which separates at 40° F., would be ineffective if used in cold weather because there would be lacking the cooperative functioning of the various solvents.

The rate of evaporation of a paint and varnish removing mixture containing petroleum hydrocarbons and a wax changes surprisingly with the variation in the boiling range of these hydrocarbons. The higher the boiling point range of wax solvent (i. e. petroleum fraction), the higher will be the rate of evaporation if all other light volatile solvents included in the remover are the same, e. g., for a remover composed of:

| | Parts |
|---|---|
| Petroleum hydrocarbons (of given boiling range) | 50 |
| Methyl acetate | 25 |
| Acetone | 25 |
| Paraffin wax | 2 | the following rate of evaporation in two hours at 72° F. was determined by the method described below:

| | Percent |
|---|---|
| With petroleum ether (B. P. 40–60° C.) | 10 |
| With petroleum ether (B. P. 60–85° C.) | 30 |
| With petroleum ether (B. P. 60–115° C.) | 46 |
| With petroleum ether (B. P. 60 to about 175° C.) | 62 |

During the first half hour, the respective amounts of evaporation were about 2.5, 6.6, 12 and 19%.

To determine the rate of evaporation of paint and varnish removers, the following method was used: A sample of remover of about 20 grams was put in a flat dish about 7 cm. in diameter and about 1 cm. high (the depth of layer under these conditions approximating 7 mm.). The sample was kept at a temperature in the neighborhood of 72–75° F. The loss in weight, due to evaporation, was determined by weighing initially and at regular intervals. These losses were calculated in per cent of the original weight of sample and were finally represented in the form of graphs giving the relation between time of exposure and per cent of losses. The slope of a curve would thus represent the rate of evaporation of a remover at the aforesaid temperature.

A remover, which, under the above described tests, gives a loss in weight in twenty-four hours not exceeding 5 or 6% will remain "wet" sufficiently long to meet most service conditions. In some cases, losses around 10% may not be objectionable. A considerably higher loss would result in compositions which under actual working conditions might evaporate too fast to be efficient.

The results of such a simple test clearly show that, for a given wax precipitant, a considerable decrease in the volatility of the wax solvents tends to create an increase in the speed of evaporation of the paint and varnish removing mixture. Examples of this phenomenon have already been given for cases when one wax solvent of low boiling point is completely substituted with a solvent of high boiling point, i. e., of lower volatility, of the same group. The same phenomenon was also observed when a part of a light wax solvent was replaced with a heavy solvent of a different nature. For example, when part of the benzol used in a given remover was substituted by tetralin (tetrahydronaphthalene) the rate of evaporation increased about 60 times. On testing the following composition,

| | Parts |
|---|---|
| Benzol | 50 |
| Acetone | 25 |
| Anhydrous methanol | 25 |
| Wax | 2 | the loss in weight in two hours was only about 0.5% and the loss of weight in twenty-four hours was found to be less than 2%, while for a composition containing part of the benzol replaced by tetralin, viz:

| | Parts |
|---|---|
| Benzol | 30 |
| Tetralin | 20 |
| Acetone | 25 |
| Anhydrous methanol | 25 |
| Wax | 2 | the loss in two hours was about 34% and the loss in twenty-four hours was 79%.

Similar tests were made on a series of mixtures in which part of the benzol in the last formula given, was replaced with high boiling petroleum hydrocarbons, such as solvent naphtha, and kerosene, and also with chlorinated hydrocarbons, such as dichlorobenzol. The composition of removers illustrating this feature was as follows:

| | B. P. °C | 1 | 2 | 3 | 4 | 5 |
|---|---|---|---|---|---|---|
| Benzol | 80 | 50 | 30 | 30 | 30 | 30 |
| Tetralin (approx.) | 205 | | 20 | | | |
| Solvent naphtha | 142 | | | 20 | | |
| Kerosene | 200–280 | | | | 20 | |
| Dichlorobenzol | 175 | | | | | 20 |
| Acetone | 57 | 25 | 25 | 25 | 25 | 25 |
| Methanol | 65 | 25 | 25 | 25 | 25 | 25 |
| Wax | | 2 | 2 | 2 | 2 | 2 |
| Loss in weight in 2 hours in % | | 1.0% | 34.0% | 17.0% | 46.0% | 39.0% |

Examination of these figures will reveal that the benzol, methyl alcohol and acetone mixture apparently represents an exceptional case, because a low rate of evaporation is obtained despite the fact that the wax precipitants have a lower boiling point and a higher volatility than the wax solvent (benzol). This apparent contradiction is explained if we take into consideration the fact that benzol and methyl alcohol, and also acetone and methyl alcohol, form constant boiling mixtures; that is, they form mixtures which evaporate uniformly. In this mixture, methyl alcohol forming a constant boiling mixture both with benzol and with acetone acts as an equalizer of volatilization, giving as a result a ternary mixture in which presumably all ingredients tend to evaporate together rather than individually. Under such conditions the initial wax film does not change in an unfavorable manner but retains sufficient of its original nature, thus maintaining the desired uniform slow rate of evaporation.

On the other hand when a mixture of solvents does not possess this property of "uniform volatility" or "collective evaporation", that is, when solvents do not form constant boiling mixtures, or their equivalents, the lighter solvents evaporate before the heavier ones, thus disturbing the initial balance between the wax, the wax solvent and the wax precipitant. When the wax solvent evaporates faster than the wax precipitant, the relative amount of wax in solution decreases and the wax film either remains as it was originally or thickens and becomes still better adapted to retard evaporation. In opposite case where a wax precipitant volatilizes more rapidly than the wax solvent, the ratio of the wax solvent to wax in the remaining liquid increases, thus creating a condition in which more wax enters into solution and this change results in the weakening or dissolution of the wax film, hence contributing to an increase in the rate of evaporation.

Furthermore this rate of evaporation is likely to progressively increase as the relative concentration of the wax solvent augments. Thus on application of a layer of remover to a surface, the initial protective film may gradually disintegrate at a faster and faster rate so that, by the time the solvent has become weakened by solvent action on the coating it suffers further and rapid impairment by incremental evaporation. At this stage, a remover should possess enough residual power to supply the finishing stroke, as it were, which drives the loosening action through to the supporting surface. Failing this, the remover secures no such commercial appreciation as the benzol-acetone type of remover, but instead is relegated to that large class of nondescript removers which are not quit good enough to rank as acceptable.

From the foregoing, it is clear that one object of the invention is to provide a cognition of those conditions which serve to raise the hitherto greatly inferior petroleum hydrocarbon removers from such last mentioned class to the standard which the benzol removers have established.

To obtain a slowly evaporating mixture adapted for practical remover purposes, solvents which form a substantially uniform evaporating mixture or solvents in which the wax precipitant is less volatile than the wax solvent therefore are advantageously used. However, in the second case, it will not be necessary to compose the whole bulk of the wax precipitant of higher boiling solvents. A part of these solvents may be less volatile than the wax solvents, while another part may be composed of more highly volatile solvents. This observation is of considerable importance from the standpoint of the paint remover purposes because, as a rule, highly volatile solvents, probably in part due to their lower viscosity or higher mobility, have a better removing or dissolving action on dried paints and varnishes than high boiling ones of slower evaporation tendencies. The use of efficient loosening solvents is of particular importance in the case of petroleum hydrocarbons in view of the inertness of these hydrocarbons themselves as solvents of dried paint and varnish.

Methyl acetate, for example, is a loosening solvent which has a beneficial influence in two distinct ways upon the mixture of petroleum hydrocarbons with other solvents. First, it serves as a blending agent for petroleum hydrocarbons with many immiscible solvents, for example, with methyl alcohol, which, in the presence of wax, otherwise is not miscible. Second, methyl acetate produces a mixture having an evaporation behavior adequate to meet requirements. Methyl acetate when mixed with a low boiling petroleum fraction (B. P. around 80° C.) produces a composition which evaporates fairly uniformly; that is, in such a mixture the ratio of hydrocarbon to methyl acetate remains sufficiently unchanged. At the same time methyl acetate forms a constant boiling mixture with methyl alcohol.

The first method to obtain a low rate of evaporation of the remover composition by unification of the rate of constituent evaporation may therefore be called "method of equalizing the volatility". The second method, where a wax precipitant with lower volatility than the wax solvent is used as one of the ingredients, may be termed "method involving the use of a volatile liquid repressant of the normal volatility of the light solvents".

In addition to a slow rate of evaporation, paint and varnish removers should satisfy another basic requirement, that of proper efficiency. The term "efficiency" includes two phases, one is speed of action, that is, solvent or cutting power of the mixture upon the dried coat of paint or varnish, and the other is penetration, that is, the property of remover to extend its solvent action through the layers of the coating. Solvents used in removing compositions may accordingly be divided into two classes, one being of the class of "penetrating solvents" which is represented by benzol, and the other class being so-called "loosening solvents". This latter class may be represented by acetone. In the majority of cases loosening solvents are not wax solvents, while penetrating solvents dissolve waxes. Both penetrating and loosening solvents vary greatly in their cutting power.

The solvent power of a remover may be observed by noting the time of the appearance of wrinkling on a painted surface after a certain amount of remover has been placed on it. To measure the comparative solvent power of various solvents and various solvent mixtures, the following method may be used to advantage: A piece of a painted surface having several coats of old paint is cut into strips. Various solvents are then placed in a series of test tubes in approximately equal quantities and a strip of the above wood is immersed into each solvent. The effect of the solvent is observed by noting the time by means of a stop watch when the same degree of wrinkling appears. If proper care be taken to keep the temperature constant the test gives sufficiently close checks. It is better to represent the solvent power or "rate of attack" as the number of seconds elapsed between the moment when strip is immersed into the solution and the appearance of wrinkling. Using this method the following figures have been obtained when representing the cutting action of various solvents.

*Table showing cutting speed of various solvents and their mixtures in seconds*

| Single solvents | Seconds |
|---|---|
| Benzol | 3600 |
| Petroleum ether (distillate 60 to 85° C.) | No action. |
| Petroleum ether (40 to 60° C.) | No action. |
| Solvent naphtha | No action. |
| Toluol | 6000 |
| Chlorobenzol | 400 |
| Trichlorethylene | 360 |
| Anhydrous methanol | 240 |
| Anhydrous ethanol | 1020 |
| Isopropyl alcohol (98%) | 2400 |
| Acetone (anhydrous) | 80 |
| Diacetone alcohol | 480 |
| "Lugosol" | 45 |
| Methyl ethyl ketone | 75 |
| Mesityl oxide | 210 |
| Furfural | 300 |
| Methyl acetate | 80 |
| Ethyl acetate | 105 |
| "Methyl cellosolve"* | 90 |
| Binary mixtures (in equal parts) | |
| Benzol and anhydrous methanol | 45 |
| Benzol and anhydrous ethanol | 150 |
| Benzol and acetone | 65 |
| Benzol and "lugosol" | 40 |
| Benzol and methyl ethyl ketone | 55 |
| Benzol and methyl acetate | 45 |
| Benzol and ethyl acetate | 75 |
| Benzol and methyl Cellosolve | 70 |
| Benzol and furfural | 90 |
| Petroleum ether and anhydrous methanol | 260 |
| Petroleum ether and ethanol | Soften only. |
| Petroleum ether and isopropyl alcohol | 1800 |
| Petroleum ether and acetone | 280 |
| Petroleum ether and "lugosol" | 100 |
| Petroleum ether and methyl ethyl ketone | 130 |
| Petroleum ether and furfural | Do not mix. |
| Petroleum ether and methyl acetate | 110 |
| Ternary mixtures | |
| Benzol, anhydrous methanol and acetone | 50 |
| Benzol, anhydrous methanol and "lugosol" | 35 |
| Benzol, anhydrous methanol and methyl acetate | 28 |
| Benzol, anhydrous methanol and methyl ethyl ketone | 32 |
| Benzol, anhydrous methanol and furfural | 45 |
| Benzol, methyl acetate and "lugosol" | 15 |
| Benzol, ethyl alcohol and acetone | 90 |
| Petroleum ether, ethyl alcohol and "lugosol" | 125 |
| Petroleum ether, ethyl alchol and acetone | 155 |
| Petroleum ether, methyl acetate and "lugosol" | 32 |
| Petroleum ether, methyl acetate and methanol | 52 |

* Methyl Cellosolve is the methyl ether of ethylene glycol, and is the trade name of said material.

The table shows that petroleum hydrocarbons, (perhaps owing to their high inertness as solvents), considerably reduce the dissolving power of other solvents, such, for example, as anhydrous methanol, methyl acetate, acetone and the like. The number of solvents which can be used practically in paint and varnish removers containing light petroleum hydrocarbons as the sole wax solvent is mainly limited to those which are least depreciated by petroleum hydrocarbons. Among the powerful loosening solvents anhydrous methyl alcohol, methyl acetate, "lugosol" and acetone, may be mentioned. Comparing these four solvents it may be seen by the table that their initial cutting rating with benzol is about equal, while the rating of their mixtures with petroleum hydrocarbons differs substantially. For example: A mixture of equal parts of methyl acetate and a certain petroleum hydrocarbon distillate was found to be more than twice as efficient as a mixture of equal parts of methanol and this distillate, or a mixture of acetone and said distillate.

"Lugosol" referred to above is a solvent obtained by condensation of acetone with a small amount of an alkaline agent (e. g. by standing 1–3 days with 0.3% of pulverized KOH, and then neutralizing), followed by removal of the unconverted acetone by distillation. This solvent has a boiling range from 60° C. to about 170° C. and possesses a strong cutting power on dried paint and varnish. While the name of "lugosol" usually refers to a product which is free from acetone, the use of the crude product, that is, a mixture of acetone with higher condensation products resulting from the treatment of acetone with an alkali, is not precluded.

While "lugosol" is a valuable loosening solvent, its use with petroleum hydrocarbons is somewhat restricted, similarly to anhydrous methyl alcohol, owing to its poor miscibility with these hydrocarbons in the presence of wax. In the latter case an additional blending and fortifying solvent, such as methyl acetate, serves as an equilibrator, yielding a composition which responds to the tests of a commercially satisfactory remover.

A number of solvents tested singly and in admixture, to determine the rate of evaporation in the absence of wax, furnish data which throw light on the peculiar qualities of light petroleum distillates such, for example, as heavy petroleum ether and casinghead naphtha fractions. The tests in this case were carried out by placing each solvent or mixture of solvents, using like amounts by volume, in open cylinders of the same size and shape. All the samples were allowed to evaporate at room temperature under the same conditions. The decrease in volume in each cylinder was noted from time to time. The results are given in the following table:

| | Sample vol. in c.c. | Solvents | Loss in volume in— | | |
|---|---|---|---|---|---|
| | | | 15 hours | 50 hours | 75 hours |
| 1 | 40 | Methyl acetate | 3 c.c. | 6 c.c. | |
| 2 | 40 | Petroleum distillate (60–85° C.) | 2 c.c. | 4 c.c. | |
| 3 | 40 | Mixture of equal parts of methyl acetate and petroleum distillate | 5 c.c. | 10 c.c. | |
| 4 | 40 | Benzol | 1.0 | 2.0 | 4.0 |
| 5 | 40 | Methanol | 2.0 | 4.0 | 6.0 |
| 6 | 40 | Mixture of equal parts of benzol and methanol | 3.0 | 6.0 | 10.0 |
| 7 | 40 | Acetone | 3 c.c. | 6.0 | 10.0 |
| 8 | 40 | Petroleum distillate (60–85° C.) | 2 c.c. | 4.5 | 6.0 |
| 9 | 40 | Mixture of equal parts of acetone and petroleum distillate | 4 c.c. | 8.0 | 13.0 |
| 10 | 40 | Methanol | 1.0 | 2.0 | 3.0 |
| 11 | 40 | Petroleum distillate (60–85° C.) | 3.0 | 6.0 | 10.0 |
| 12 | 40 | Mixture of equal parts of methanol and petroleum distillate | 3.5 | 6.5 | 12.0 |

Referring to No. 3, namely the mixture of equal parts of methyl acetate and petroleum distillate, analysis of the composition at the end of the exposure period showed the relative proportion of wax solvent to wax precipitant to be substantially unchanged. This proved true also for No. 6 which approximates in composition the standardized benzol removers (except for the absence of wax). Quite different results, however, were secured when No. 9 was analyzed after exposure. The ratio of petroleum distillate or wax solvent was found to be sixteen to eleven of the wax precipitant. Likewise No. 12 showed the same increment in wax solvent on exposure, the ratio being fifteen of petroleum distillate to thirteen of methanol. Thus it will be seen that the character of the evaporation, when petroleum distillates of the character aforesaid are employed, will vary with the composition of the wax precipitant. Increase in the proportion of the petroleum distillate, which is an extremely powerful wax solvent, reflects immediately in upsetting the wax equilibrium and the character of the film which forms on exposure. Maintenance of the integrity of state of film depends in part and to an important extent on preventing an increase in the relative amount of the wax solvent. Methyl acetate, used as set forth in No. 3, acts as a equilibrator of evaporation unifying the evaporation tendency of the individual solvents and establishing a collective evaporation tendency which does not result in the upsetting of wax equilibrium.

An equilibrated paint and varnish removing composition containing wax, a solvent comprising at least a substantial proportion of a light volatile petroleum hydrocarbon, and a wax precipitant, which composition has a cutting efficiency about equal to the standard benzol-acetone-wax paint and varnish remover and possesses approximately a similar low rate of evaporation is made as follows:

|  | Parts by vol. |
|---|---|
| Casinghead naphtha distillate | 50 |
| Toluol | 20 |
| Methanol (anhydrous) | 100 |
| Methyl acetate | 20 |
| Paraffin wax | 3 |

The casinghead naphtha distillate boiled largely between 60 and 85° C.; the boiling range being 75% over at this temperature, 5% at 85–100° C., and 20% at 100–115° C. The rate of evaporation is somewhat faster than the standard benzol remover due probably in part to the presence of the heavier wax solvent toluol, but the cutting speed is excellent and such a remover therefore may be used to advantage except for extreme service conditions.

It has been noted that light petroleum hydrocarbons, such as those described aforesaid, have an unusual solvent power on mineral wax, such as paraffin or ceresin wax. This may seem surprising in view of the extreme inertness as a solvent in paint and varnish removers of such hydrocarbons. A remover in which benzol is the essential wax solvent may contain the latter substantially in excess of the wax precipitant and still have available enough active film forming wax to retard evaporation. Thus, for example, eight parts of benzol may be used to seven parts of methanol with several per cent of wax to yield a satisfactory film. If the same proportion of light petroleum distillate is substituted for the wax, the wax precipitant ordinarily does not exert sufficient precipitating action and the composition will not cloud up due to precipitated or colloidal wax but will remain clear and will not form an effective film. This, of course, assumes that the solvents in question are miscible. Since, as stated, wax has an extraordinary effect in causing separation or preventing miscibility when petroleum distillates, as stated, are used, the further difficulty arises of stratification with consequent loss of homogeneity and therefore failure of cooperative attack by the solvents on a coat of dried paint or varnish. It is possible that the strong solvent action of these petroleum distillates on wax is partly responsible for the disturbing action of even small amounts of wax on conditions of miscibility.

An illustration of a composition which has a very rapid rate of evaporation is the following:

|  | Parts by vol. |
|---|---|
| Casinghead naphtha distillate | 50 |
| Toluol | 20 |
| Methanol (anhydrous) | 100 |
| Paraffin wax | 2 |

This composition remained clear in a warm room without formation of any film on exposure and showed a very rapid rate of evaporation, namely over 50% loss in weight in about fifteen minutes. This result is in striking contrast to the preceding formula which shows a loss in weight of 9% in about two hours. This small proportion of methyl acetate therefore suffices to convert a composition of comparatively slight value from the removing standpoint into one which is moderately effective and sufficiently so for many purposes, i. e., coats of paint, varnish and lacquer which are not of extreme thickness.

An equilibrated paint, varnish and lacquer remover, the wax solvent of which is substantially or entirely free from benzol, which contains wax in low content and which has a cutting speed which is as fast if not faster than the standardized benzol-acetone-wax remover is the following:

|  | Parts by vol. |
|---|---|
| Petroleum ether (B. P. 60–85° C.) | 30 |
| Methanol (anhydrous) | 50 |
| Methyl acetate | 20 |
| Paraffin wax | 2 |

This composition represents a remover which offers practical advantages having a highly desirable cutting speed. In one test the speed was 80 seconds in comparison with 120–130 seconds for the standard benzol remover. Another advantage in this equilibrated remover is its extremely low rate of evaporation, the loss in weight being only about 0.5% in two hours at 75° F. In this composition it should be observed that the wax solvent is in minor proportion and the wax precipitant in major proportion.

Another composition is the following:

|  | Parts by vol. |
|---|---|
| Petroleum ether (B. P. 60–85° C.) | 30 |
| Methanol (anhydrous) | 30 |
| Methyl acetate | 40 |
| Paraffin wax | 2 |

In a number of the foregoing formulas it will be noted that the wax content is reduced to a very low percentage in comparison to many other paint and varnish removing compositions. Wax, being of a slightly greasy character and tendency to prevent the proper drying of coatings which subsequently may be applied, is an undesirable constituent in any large proportion. If the remover works its way into cracks in the surface and the wax is not thoroughly washed out by cleansing that surface after the softened finish has been removed such wax is liable to cause blemishes in the subsequent coatings. This is especially true in the case of lacquers.

The formulas set forth immediately above are especially serviceable for softening lacquer because of the presence of the powerful nitrocellulose solvent methyl acetate and the low content of wax. Using so low a content of wax in the presence of the powerful wax solvent petroleum ether calls for balancing the solvents in the manner set forth illustratively above.

The last mentioned composition has a cutting speed of 120 seconds which compares favorably with the standard benzol remover. The loss in weight in two hours is about 1%. This remover therefore meets both of the fundamental requirements delineated above, namely, effective cutting speed and extremely low rate of evaporation. It has the advantage of absence of benzol and also benzol derivatives, such as toluol.

Should the presence of methanol in substantial proportion be considered objectionable the following non-benzolic remover may be used:

| | | |
|---|---|---|
| Casinghead naphtha distillate (B. P. 60–115° C.) | 25 | 30 |
| "Ansol" | 40 | 40 |
| Acetone | 35 | 15 |
| Methyl acetate | -- | 15 |
| Paraffin wax | 3 | 3 |

The "ansol" employed is a form of denatured alcohol containing about 85% anhydrous ethyl alcohol, the balance being ethyl acetate, a small percentage of methanol and hydrocarbons, such as gasoline and toluol.

The substitution of ethyl alcohol as represented by the "ansol" composition slows the cutting action somewhat, the rate being 220 seconds and 190 seconds respectively for the two compositions just noted. The evaporation rate is slightly better for the first formula than the second, but both are within satisfactory range; these being 0.5% and 2% respectively.

While these two compositions are somewhat slower in activity as compared with the standardized benzol remover with its cutting speed of 120 up to possibly 150 seconds, they are satisfactory for many purposes.

A composition in which "lugosol" is used is the following:

| | |
|---|---|
| Casinghead naphtha distillate (B. P. 60–115° C.) | 30 |
| Methyl acetate | 50 |
| "Lugosol" | 50 |
| Paraffin wax | 2 |

The loss in weight in two hours is 1.2%. The cutting speed is slightly over 200 seconds. Without the methyl acetate as a repressant of volatilization the rate of evaporation would be very much greater.

In referring to standard benzol remover or standardized benzol-acetone-wax remover, I intend to designate compositions made from benzol and acetone in, say, equal parts by volume or usually with the benzol slightly predominating and with the content of wax usually ranging from 2 to 4%. It is also customary to replace a part of the acetone with other solvents, such as methyl or ethyl alcohol, and since such substitution, if not carried to excess, does not greatly alter the cutting sped of the remover I include such three solvent mixtures and the like within the definition of the term "standardized benzol-acetone-wax remover" or "standard benzol remover".

It should be understood that the cutting speed which is expressed in seconds in the foregoing is merely relative and will vary in an absolute way depending upon the character of the coating on which the test to establish relationship is conducted.

In several of the foregoing compositions methyl acetate has been set forth as a useful equilibrator. Various other solvent bodies such as ethyl acetate, isopropyl acetate, methyl ethyl ketone, hexalin and cyclohexanone likewise may be used. In some cases isopropyl alcohol may be employed. However, in order to maintain the composition of cutting activity approximating that of the standard benzol remover, slower acting substances such as isopropyl alcohol are not as suitable unless used in small proportion and supplemented by more potent solvents. Mixtures of equilibrating solvents may be employed if desired. In some cases one solvent will function as an agent to produce miscibility, but does not act to depress evaporation. In such a case it is possible to introduce another solvent which brings about satisfactory depression of evaporation. In these circumstances the two solvents will act jointly as an equilibrator.

Thus, methyl and ethyl formate, anisol (oxymethylbenzol), and various other solvents tend to produce miscibility between petroleum hydrocarbons such as casinghead naphtha and other solvents normally immiscible in the presence of wax, such for example as methanol used in equal proportion with casinghead naphtha. Yet these same solvents which produce this miscibility may not act as depressors of evaporation.

Another case is that of a solvent which acts as a depressor of evaporation, but is not capable of maintaining miscibility, at least when used in the proportions ordinarily required in paint and varnish removers to create the proper colloidal film-forming condition of the wax.

"Lugosol" is an example of a depressor of evaporation which is not sufficiently active in producing miscibility. Thus, a mixture of casinghead naphtha, methanol, "lugosol" and wax will separate into two layers, while the addition of a substance such as ethyl formate, capable of producing miscibility, but not of materially depressing evaporation, will, in conjunction with "lugosol" yield a composite equilibrator.

An equilibrator therefore may either form with the hydrocarbon wax solvent a mixture of real or virtual constant boiling point (e. g. a low boiling solvent such as methyl acetate) or may have so low a degree of volatility (e. g. a wax precipitant of relatively high boiling point, such as cyclohexanone) that its concentration in the remover does not decrease on exposure but rather tends to increase without disturbance of miscibility and without impairment of the waxy protecting film.

The following examples illustrate some or all of the foregoing considerations. The temperatures of observation, namely 85–86° F., of loss of weight are higher than those previously cited. The conditions thus are more drastic. Observations regarding the appearance of the remover such as presence of precipitated wax also were made at the same temperature, viz: 85–86° F. (Note: In all cases boiling points are given in degrees centigrade, while room temperatures and those representing loss by evaporation within the range of working temperatures are given in degrees Fahrenheit).

I.—*Solvent bodies possessing the properties of an equilibrator*

This group includes solvents which act simultaneously as agents of miscibility and as depressors of evaporation.

| | Parts by vol. |
|---|---|
| Casinghead naphtha (B. P. 60 to 115° C.) | 40 |
| Anhydrous methanol | 40 |
| Methyl acetate | 30 |
| Paraffin wax | 2 |

This mixture forms a miscible composition, containing some precipitated wax at 86° F. Cutting speed 130–140 seconds. Loss in weight in 2 hours at 86° F. about 8%; in 48 hours about 12.0%.

A mixture of casinghead naphtha and methanol in equal parts in presence of a wax did not mix, and when tested for loss in weight gave in 2 hours at 86° F. about 43% and in 48 hours 97% loss. In the above case methyl acetate, despite having a lower boiling point (54° F.) than the wax solvent used, produced considerable reduction in the rate of evaporation.

| | Parts by vol. |
|---|---|
| Casinghead naphtha (B. P. 60 to 115° C.) | 40 |
| Anhydrous methanol | 40 |
| Ethyl acetate | 30 |
| Paraffin wax | 2 |

This yields a mixture, containing precipitated wax at 86° F. Cutting speed 240–250 seconds. Loss in weight at 86° F. in 2 hours 10.0%; in 48 hours 11.8%.

Ethyl acetate having boiling point 77.0° C., which is close to that of the boiling point of the average of the wax solvent used, behaves somewhat like methyl acetate but with a cutting speed measurably slower.

| | Parts by vol. |
|---|---|
| Casinghead naphtha (B. P. 60 to 115° C.) | 40 |
| Anhydrous methanol | 40 |
| Isopropyl acetate | 30 |
| Paraffin wax | 2 |

Gives almost a clear solution, containing a very small amount of precipitated wax at 86° F., redissolving in an excess of ester. Cutting speed 350–360 seconds. Loss in weight at 86° F. in 24 hours less than 0.5%; in 48 hours 1.5%. Isopropyl acetate has a boiling point 90.0° C., that is higher than largest part of the wax solvents used (about 75% of fraction boiling 60 to 85° C.).

| | Parts by vol. |
|---|---|
| Casinghead naphtha (B. P. 60 to 115° C.) | 40 |
| Anhydrous methanol | 40 |
| Methyl ethyl ketone (B. P. 80° C.) | 30 |
| Paraffin wax | 2 |

Perfect miscibility, solution containing precipitated wax. Cutting speed 150–160 seconds. Loss in weight at 86° F. in 2 hours less than 0.5%.

| | Parts by vol. |
|---|---|
| Casinghead naphtha (B. P. 60 to 115° C.) | 40 |
| Anhydrous methanol | 40 |
| Hexalin | 20 |
| Paraffin or ceresin wax | 2 |

A clear solution, containing a small amount of precipitated wax. Cutting speed 360–400 seconds. Loss in weight at 86° F. in 2 hours about 1.0%; in 48 hours 10.0%. Hexalin in this case acts as depressor of evaporation due to the combined qualities of miscibility and boiling point being considerably higher than the wax solvent.

| | Parts by vol. |
|---|---|
| Casinghead naphtha (B. P. 60 to 115° C.) | 40 |
| Anhydrous methanol | 40 |
| Cyclohexanone (B. P. 158° C.) | 20 |
| Paraffin wax | 2 |

A clear solution, containing some precipitated wax. Cutting speed 240–250 seconds. Loss in weight at 86° F. in 2 hours about 2.0%; in 48 hours 14.5%.

II.—*Solvent bodies possessing blending properties but not acting as depressors of evaporation*

| | Parts by vol. |
|---|---|
| Casinghead naphtha (B. P. 60 to 115° C.) | 40 |
| Anhydrous methanol | 40 |
| Methyl formate (B. P. 31° C.) | 20 |
| Paraffin wax | 2 |

Yields a uniform solution, without precipitated wax. Evaporated very fast. Loss in weight in 2 hours over 60%.

| | Parts by vol. |
|---|---|
| Casinghead naphtha (B. P. 60 to 115° C.) | 40 |
| Anhydrous methanol | 40 |
| Ethyl ether (B. P. 35° C.) | 20 |
| Paraffin wax | 2 |

These components are miscible, the solution containing some precipitated wax. This precipitated wax redissolved on the addition of an excess of ether. Loss in weight at 80° F. in 2 hours about 60%.

| | Parts by vol. |
|---|---|
| Casinghead naphtha (B. P. 60 to 115° C.) | 40 |
| Anhydrous methanol | 40 |
| Ethyl formate (B. P. 54° C.) | 20 |
| Paraffin wax | 2 |

The solvents are miscible, the solution containing a small amount of precipitated wax. Loss in weight at 86° F. in 2 hours over 65%. Compare this with the methyl acetate composition given above. Both these esters boil at about the same point, but produce different effects.

| | Parts by vol. |
|---|---|
| Casinghead naphtha (B. P. 60 to 115° C.) | 40 |
| Anhydrous methanol | 40 |
| Isopropyl ether (B. P. 64.0° C.) | 20 |
| Paraffin wax | 2 |

No separation of solvents. Mixture contains precipitated wax, which redissolves in an excess of the ether. Loss in weight in 2 hours at 80° F. about 50%.

| | Parts by vol. |
|---|---|
| Casinghead naphtha (B. P. 60 to 115° C.) | 40 |
| Anhydrous methanol | 40 |
| Anisol (B. P. 154° C.) | 20 |
| Paraffin wax | 2 |

A clear uniform solution, containing no wax precipitate. Loss in weight at 86° F. in 2 hours, 28%; in 48 hours over 95%. In this case, despite the considerably higher boiling point of the blending agent as compared with the wax solvent, no depression of evaporation was produced. Comparing with cyclohexanone, a substance of approximately the same boiling point—anisol has a noticeable wax solvent effect and, therefore, its presence in increasing proportion in the remover tends to weaken the wax film rather than to improve it.

III.—*Composite equilibrators*

This group, represents the employment of a combination of solvents, which individually are not equilibrators, lacking one of the necessary properties but which jointly produce the desired action. "Lugosol" does not blend readily with petroleum hydrocarbons and methanol mixtures in the presence of wax, but if used in conjunction with a blending agent, it produces a considerable depression in the rate of evaporation.

| | Parts by vol. |
|---|---|
| Casinghead naphtha (B. P. 60 to 115° C.) | 30 |
| Anhydrous methanol | 30 |
| "Lugosol" (B. P. 60 to 170° C.) | 20 |
| Ethyl formate (B. P. 54° C.) | 20 |
| Paraffin wax | 2 |

An unstratified solution, containing precipitated wax. Cutting speed 180–200 seconds. Loss in weight at 80° F. in 2 hours, 1.3%.

(Note: A similar composition without the blending agent, that is, made only with casinghead naphtha, methanol, "lugosol" and wax, shows a loss in weight in 2 hours of around 48%).

Comparing this with the previous composition containing ethyl formate but no "lugosol", the depression of evaporation is plainly observable, although a more volatile solvent has been added.

|  | Parts by vol. |
|---|---|
| Casinghead naphtha (B. P. 60 to 115° C.) | 30 |
| Anhydrous methanol | 30 |
| "Lugosol" (B. P. 60 to 170° C.) | 20 |
| Ethyl ether (B. P. 35° C.) | 20 |
| Paraffin wax | 2 |

Composition unstratified, containing precipitated wax. Cutting speed 300–320 seconds. Loss in weight at 80° F. in 2 hours less than 1%, despite using a very light solvent.

|  | Parts by vol. |
|---|---|
| Casinghead naphtha (B. P. 60 to 115° C.) | 30 |
| Anhydrous methanol | 30 |
| "Lugosol" (B. P. 60 to 170° C.) | 20 |
| Isopropyl ether (B. P. 64° C.) | 20 |
| Paraffin wax | 2 |

Unstratified solution, containing precipitated wax. Cutting speed 300–320 seconds. Loss in weight in 2 hours at 80° F., 1%.

The following composition is bodied with nitrocellulose:

| Heavy petroleum ether (B. P. 60 to 85° C.) | 30 parts by vol. |
|---|---|
| Anhydrous methanol | 20 parts by vol. |
| Methyl acetate | 40 parts by vol. |
| Paraffin wax | 2 parts by vol. |
| Celluloid scrap | 1 part by vol. |
| Cutting speed | 200 seconds |

In Serial No. 217,014, filed September 1, 1927, I have disclosed the employment of petroleum ether and casinghead naphtha distillate, especially in minor proportion, e. g. 20–30%, the major part of the composite solvent preferably being a wax-precipitant of the nitrocellulose (lacquer) solvent type. Thus methyl and ethyl acetate are used with acetone, methyl alcohol and so forth, to form a waxy-precipitant loosening agent. Compositions which on exposure tend to increase the proportion of wax precipitant also are described. The present application, therefore, is a continuation-in-part of Serial No. 217,014, now U. S. Patent No. 1,884,632.

In numbers 10 and 49 "oxy-paraffin" constituted the wax used. In number 42 beeswax was the wax used. In number 50 "oxy-ceresin" constituted the wax used. In all the remaining cases paraffin wax was used.

*Table showing composition and properties of various paint and varnish removers containing petroleum hydrocarbons*

| Remover number | Composition (parts by volume) ||||||||||| Properties ||||||
|---|---|---|---|---|---|---|---|---|---|---|---|---|---|---|---|---|
|  | Wax solvents ||||||| Wax precipitant |||||||||
|  | Light petroleum ether B. P. 40–60° C. | Heavy petroleum ether B. P. 60–85° C. | Casinghead naphtha distillate B. P. 60–115° C. | Benzol | Toluol | Anhydrous methanol | Methyl acetate | Anhydrous acetone | Lugosol | Wax | Separation of solvents | Presence of precipitated wax | Character of film | Loss in weight in 2 hours—% | Cutting speed in seconds | Note |
| 1 |  | 50 |  |  |  |  | 25 | 25 |  | 2 | No. | No. | Poor. | 48 |  | A |
| 2 |  | 50 |  |  |  |  | 25 | 25 |  | 4 | No. | No. | Poor. | 31 |  | A |
| 3 |  | 50 |  |  |  | 25 | 25 |  |  | 2 | No. | No. | Poor. | 48 |  | A |
| 4 | 50 |  |  |  |  |  | 25 | 25 |  | 2 | No. | Yes. | Med. | 11 |  |  |
| 5 |  | 50 |  |  |  |  | 25 | 25 |  | 2 | No. | No. | Poor. | 61 |  |  |
| 6 | 50 |  |  |  |  | 100 |  |  |  | 4 | Yes. |  |  |  |  |  |
| 7 | 50 |  |  |  |  | 114 |  |  |  | 4 | Yes. |  |  |  |  |  |
| 8 | 50 |  |  |  |  | 150 |  |  |  | 4 | No. | Yes. | Good. | .5 |  |  |
| 9 | 50 |  |  |  |  | 200 |  |  |  | 4 | No. | Yes. | Good. | .5 |  |  |
| 10 | 50 |  |  |  |  | 100 |  |  |  | 4 | No. | Yes. | Med. | 4 |  |  |
| 11 |  | 35 |  |  |  | 35 |  |  | 30 | 2 | Yes. |  |  |  |  |  |
| 12 |  | 30 |  |  |  | 30 |  |  | 40 | 2 | Yes. |  |  |  |  |  |
| 13 |  | 50 |  |  |  |  |  |  | 50 | 2 | Yes. |  |  |  |  |  |
| 14 |  | 30 |  |  |  | 30 |  |  | 40 | 2 | No. | Yes. | Med. | No. | 480 | B |
| 15 |  | 15 |  | 15 |  | 30 |  |  | 40 | 2 | No. | Yes. | Good. | No. | 250 | B |
| 16 |  | 15 |  |  | 15 | 30 |  |  | 40 | 2 | No. | Yes. | Good. | .5 | 270 | B |
| 17 | 15 | 15 |  |  |  | 30 |  |  | 40 | 2 | No. | Yes. | Good. | 1 | 300 | B |
| 18 | 15 | 15 |  |  |  | 30 |  |  | 40 | 2 | Yes. | Yes. | Good. | 1 | 300 |  |
| 19 |  | 30 |  |  |  |  | 40 |  |  | 2 | No. | Yes. | Good. | .5 | 540 |  |
| 20 |  | 30 |  |  |  | 30 | 40 |  |  | 2 | No. | Yes. | Good. | 2.3 | 660 |  |
| 21 |  | 30 |  |  |  | 30 | 40 |  |  | 2 | No. | Yes. | Good. | 1 | 120 |  |
| 22 |  | 40 |  |  |  | 20 | 20 |  | 20 | 2 | Yes. |  |  |  |  |  |
| 23 |  | 30 |  |  |  | 20 | 30 |  | 20 | 2 | No. | Yes. | Med. | 2.3 | 145 |  |
| 24 |  | 50 |  |  |  |  | 25 |  | 25 | 2 | Yes. | Yes. | Med. | 2.3 | 145 |  |
| 25 |  | 35 |  |  |  |  | 30 |  | 35 | 2 | Yes. | Yes. | Med. | 2.3 | 145 |  |
| 26 |  | 15 |  | 15 |  | 30 |  | 40 |  | 2 | No. | Yes. | Good. | 1.4 | 245 |  |
| 27 |  | 15 |  |  | 15 | 30 |  |  | 40 | 2 | No. | Yes. | Good. | 1.0 | 180 |  |
| 28 |  | 15 |  |  | 15 | 30 |  |  | 40 | 2 | No. | Yes. | Good. | No. | 155 |  |
| 29 |  | 30 |  |  |  | 50 | 20 |  |  | 2 | No. | Yes. | Good. | .5 | 80 |  |
| 30 |  | 25 |  |  | 25 |  |  | 25 |  | 2 | No. | Yes. | Med. | 5 | 210 | C |
| 31 |  |  | 40 |  |  | 20 | 20 |  | 20 | 2 | Yes. |  |  |  |  |  |
| 32 |  |  | 30 |  |  |  | 50 |  | 50 | 2 | No. | Yes. | Good. | 1.2 | 210 |  |

Note A. In numbers 1, 2 and 3 the petroleum distillate used had a boiling point range of 60–115° C.

Note B. In numbers 14 to 17 inclusive, and number 20, isopropyl alcohol of 92% strength was used in place of methanol.

Note C. In number 30 solvent naphtha was used in place of toluol and methyl ethyl ketone was used in place of acetone.

Table showing composition and properties of various paint and varnish removers containing petroleum hydrocarbons—Continued

| | Composition (parts by volume) | | | | | | | | | | Properties | | | | | |
|---|---|---|---|---|---|---|---|---|---|---|---|---|---|---|---|---|
| | Wax solvents | | | | | Wax precipitant | | | | | | | | | | |
| Remover number | Light petroleum ether B.P. 40–60° C. | Heavy petroleum ether B.P. 60–85° C. | Casinghead naphtha distillate B.P. 60–115° C. | Benzol | Toluol | Anhydrous methanol | Methyl acetate | Anhydrous acetone | Lugosol | Wax | Separation of solvents | Presence of precipitated wax | Character of film | Loss in weight in 2 hours—% | Cutting speed in seconds | Note |
| 33 | | | 25 | | | 25 | 25 | | 25 | 2 | No. | Yes. | Good. | 2.0 | 300 | |
| 34 | | | 30 | | | 50 | 50 | | | 2 | No. | Yes. | Good. | No. | 270 | |
| 35 | | | 25 | | | 25 | 25 | 25 | | 2 | No. | Yes. | Good. | 1.0 | 255 | |
| 36 | | | 30 | | | | 50 | 50 | | 2 | No. | Yes. | Good. | 1.0 | 280 | |
| 37 | | | 40 | | 10 | 50 | | | | 2 | Yes. | | | | | |
| 38 | | | 40 | | 10 | 30 | 20 | | | 2 | No. | No. | No film. | Very fast. | | |
| 39 | | | 40 | | 30 | 40 | | | | 2 | No. | No. | No film. | Very fast. | | |
| 40 | | | 30 | | 30 | 40 | | | | 2 | No. | No. | No film. | Very fast. | | |
| 41 | | | 40 | | 10 | 40 | 10 | | | 2 | No. | No. | No film. | Very fast. | | |
| 42 | | | 40 | | 10 | 40 | 10 | | | 2 | No. | No. | No film. | | | |
| 43 | | | 50 | | 20 | 100 | 10 | | | 2 | No. | Yes. | Good. | 9.2 | 130 | |
| 44 | | | 50 | | 20 | 100 | | | | 2 | No. | No. | No film. | 9.2 | 130 | |
| 45 | | | 50 | | | | 50 | | | 2 | No. | No. | No film. | | | |
| 46 | | | 50 | | | | | 50 | | 2 | No. | No. | No film. | | | |
| 47 | | | 50 | | | 25 | | 25 | | 2 | No. | No. | No film. | | | |
| 48 | | | 50 | | 20 | 100 | 20 | | | 3 | No. | Yes. | Med. | 9.0 | 130 | |
| 49 | | | 40 | | 30 | 80 | | | | 3 | No. | Yes. | Good. | 5.6 | 160 | |
| 50 | | | 40 | | 30 | 100 | | | | 3 | No. | Yes. | Good. | 4.5 | 145 | |
| 51 | | | 40 | | | 30 | | 30 | | 2 | No. | Slight. | Poor. | | | D |
| 52 | | | 40 | | | 30 | 30 | | | 2 | No. | No. | No film. | | | D |
| 53 | | | 25 | | | 40 | | 35 | | 3 | No. | Yes. | Good. | 0.5 | 220 | D |
| 54 | | | 30 | | | 40 | 15 | 15 | | 3 | No. | Yes. | Good. | 2.0 | 190 | D |

Note D. In numbers 51 to 54, "Ansol M" was used in place of methanol.

What I claim is:

1. A finish remover containing wax and about 20 to 40% of a wax solvent of which substantially over 75% is petroleum hydrocarbons distilling below 115° C., and containing a wax precipitant selected from the herein described group consisting of methanol, denatured alcohol, acetone and "lugosol", and an equilibrator containing a low alkyl acetate, the said wax precipitant constituting not substantially below 60% of the total liquids present in the remover.

2. A finish remover containing wax and about 20 to 40% of a wax solvent of which substantially over 75% is petroleum hydrocarbons distilling below 115° C., and containing at least 25 to 40% of a wax precipitant selected from the herein described group consisting of methanol, denatured alcohol, acetone, and "lugosol", and at least about 20% of an equilibrator containing methyl acetate.

3. A finish remover containing wax and about 20 to 40% of a wax solvent of which substantially over 75% is petroleum hydrocarbons distilling below 115° C., at least about 25 to 40% of a wax precipitant selected from the herein described group consisting of methanol, denatured alcohol, acetone, and "lugosol", and at least about 10% of an equilibrator selected from the herein described group consisting of methyl acetate, ethyl acetate, isopropyl alcohol, isopropyl acetate, ethyl formate, methyl ethyl ketone and cyclohexanone.

4. A finish remover as in claim 1, in which the combined wax precipitant and equilibrator are in excess of the hydrocarbon wax solvent, in the ratio of at least 60:40.

5. A paint and varnish remover containing wax and about 20 to 40 volumes of a wax solvent of which at least 75% is composed of petroleum hydrocarbons boiling below 115° C., and containing about 25 to 40 volumes of at least one wax precipitant selected from the herein described group consisting of methanol, denatured alcohol, acetone, "lugosol", and 10 to 40 volumes of at least one equilibrating wax precipitant selected from the herein described group consisting of methyl acetate, ethyl acetate, isopropyl alcohol, isopropyl acetate, ethyl formate, methyl ethyl ketone and cyclohexanone, such remover being free from substantial amounts of free organic acids and having a cutting efficiency of standardized benzol-acetone-wax remover and remaining wet substantially as long, when applied, as standardized benzol-acetone-wax remover, the wax solvent being in amount less than the wax precipitants.

6. A finish remover containing about 2% of wax, in a liquid containing about 30% of petroleum ether, about 50% of methanol and about 20% methyl acetate.

7. An equilibrated finish remover comprising wax, about 20 to 40% of a wax solvent composed in large part at least of petroleum hydrocarbons boiling at temperatures below 115° C. and free from any considerable fractions of petroleum hydrocarbons having boiling points above 115° C., and wax precipitant liquid constituting the major portion of the entire remover, selected from the herein described group consisting of methanol, acetone and "lugosol", and including a blending agent selected from the group consisting of methyl acetate, methyl ethyl ketone and ethyl acetate, such entire remover remaining in the form of a mixed liquid carrying precipitated wax.

CARLETON ELLIS.